April 11, 1961     J. F. MARQUARDT     2,979,325
MOUNTING STRUCTURE FOR SPRING AND AXLE ASSEMBLY Filed May 11, 1959     2 Sheets-Sheet 1

INVENTOR
Julius F. Marquardt
Paul O. Pippel
ATTORNEY

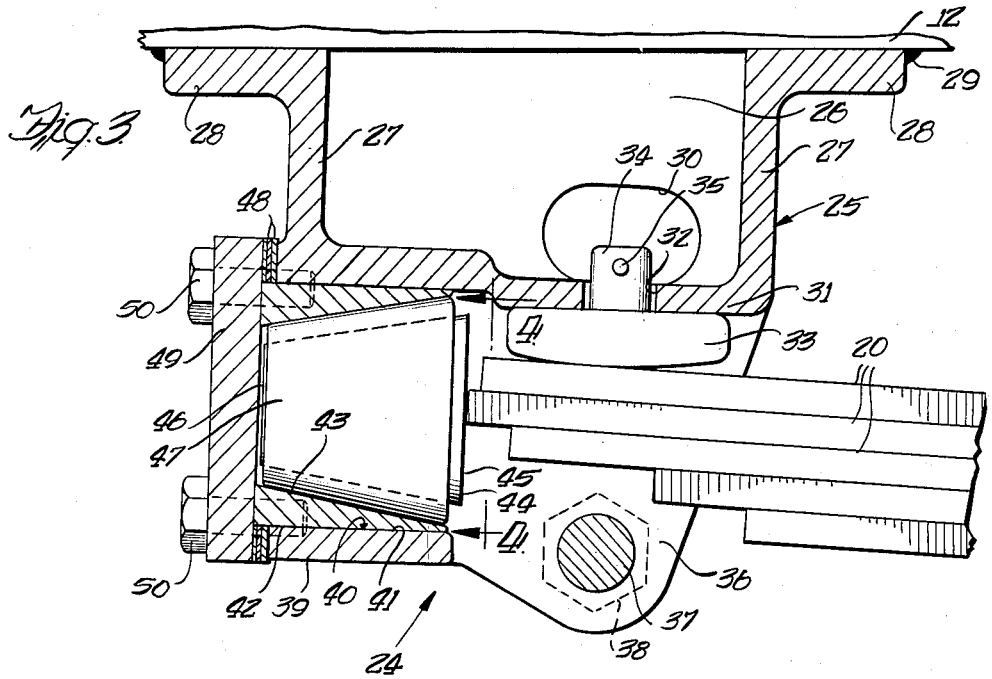
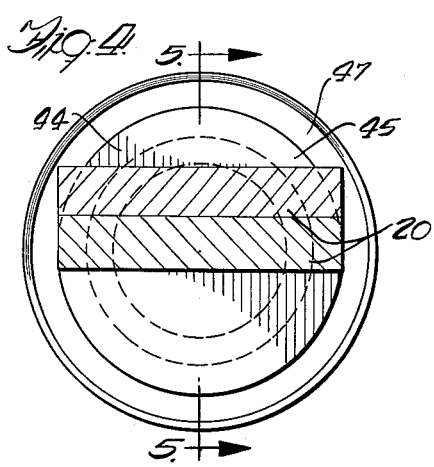
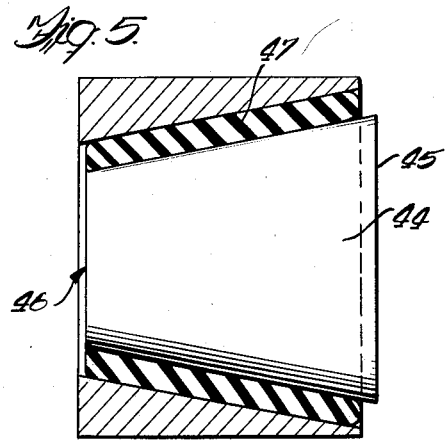

# United States Patent Office 2,979,325
Patented Apr. 11, 1961

2,979,325

MOUNTING STRUCTURE FOR SPRING AND AXLE ASSEMBLY

Julius F. Marquardt, Westchester, Ill., assignor to International Harvester Company, Chicago, Ill., a corporation of New Jersey Filed May 11, 1959, Ser. No. 812,419

10 Claims. (Cl. 267—30)

This invention relates to vehicles and particularly a wheel support assembly. More specifically the invention relates to a mounting structure for an axle and spring assembly.

It is a prime object of this invention to provide an improved mounting structure for connecting a wheel, axle and spring assembly to the chassis of a vehicle.

A more specific object is to provide a resilient mounting structure for mounting a spring and axle assembly to the chassis of a vehicle.

Another object is to provide an improved mounting structure for an axle and spring assembly, said mounting structure being adapted to floatingly support the axle wheel and spring assembly and to center the said assembly during a non-moving position of a vehicle chassis.

A still further object is to provide an improved mounting structure for floatingly supporting an axle and spring assembly, said mounting structure being adapted to absorb surge or driving loads during forward or rearward movement of a vehicle.

A still further object is to provide a resilient mounting structure for an axle and spring construction, said mounting structure including a resilient cushioning means including thrust member longitudinally adjustable to accommodate a leaf spring.

Another object is to provide an improved resilient mounting structure for floatingly supporting an axle and spring construction on a vehicle chassis, the said structure permitting absorption of peak and driving loads, being adapted to center the spring and axle assembly during non-moving conditions, the said mounting structure requiring a minimum of maintenance during operation.

A still further object is to provide an improved resilient mounting structure for an axle, said structure being adapted to readily adjust itself to changes in spring length occurring as a result of changes in weight on said vehicle and changes due to road modulations.

These and further objects will become more readily apparent from a reading of the description when examined in connection with the accompanying drawings.

In the drawings:

Figure 3 is an enlarged cross sectional view taken substantially along the line 3—3 of Figure 2;

Figure 4 is a cross sectional view of a portion of a mounting structure taken substantially along the line 4—4 of Figure 3; and Figure 5 is a cross sectional view taken along the line 5—5 of Figure 4.

Figure 1:
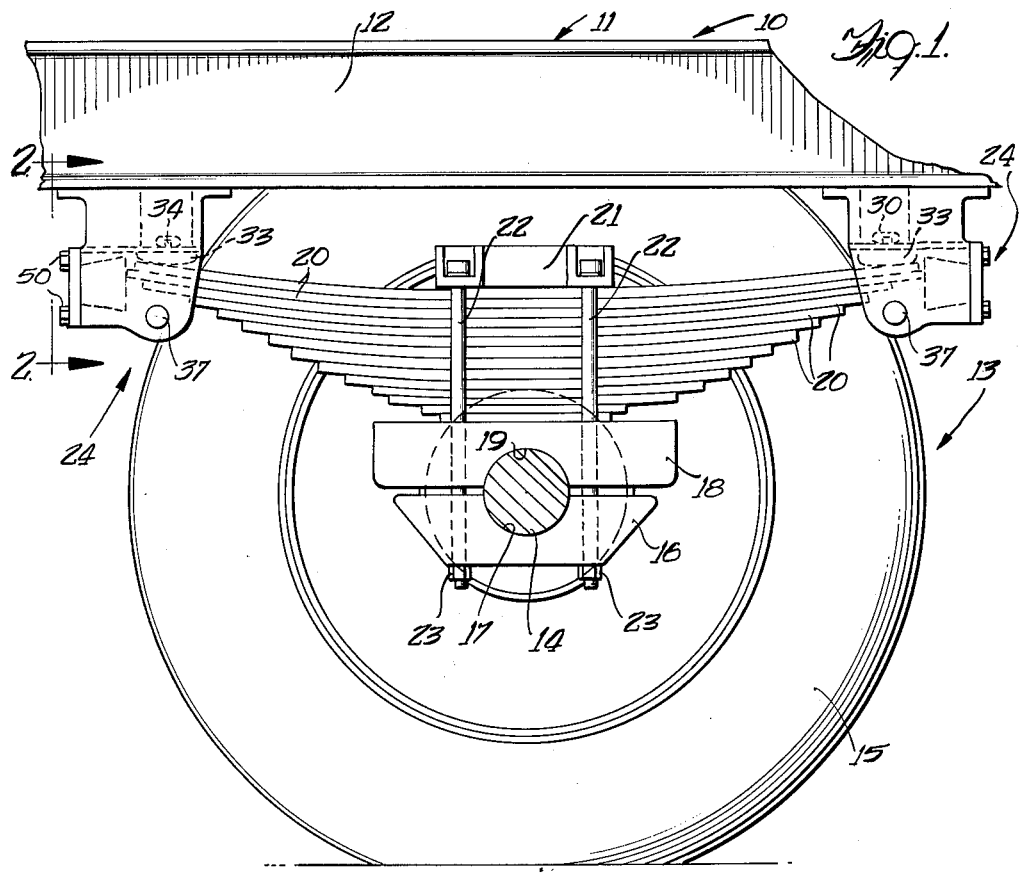
Figure 1 is a side elevational view of a portion of a vehicle chassis having an improved mounting structure for connecting an axle, wheel, and spring assembly to said chassis.
Figure 2:
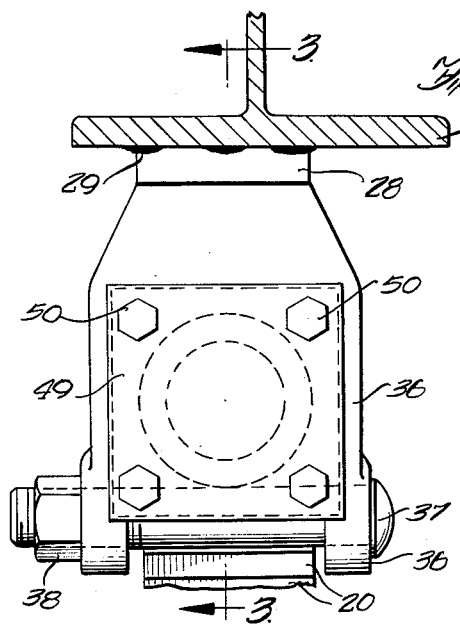
Figure 2 is a cross sectional view taken substantially along the line 2—2 of Figure 1.

Referring now to Figure 1, a vehicle is generally designated by the reference character 10, the said vehicle including a chassis 11 comprising a pair of longitudinally extending I-shaped frame members 12, only one of which is shown. A wheel support assembly is generally designated at 13, the said assembly 13 comprises an axle 14 having a ground wheel 15 supported on said axle 14. The vehicle 10 which is disclosed may be a two-wheeled vehicle or may comprise as many axles and wheels as desired. In the present invention only one wheel and one wheel support assembly and related parts are shown.

The wheel support assembly 13 includes a lower securing bracket 16 having a pocket 17 which receives a portion of the axle 14. An upper securing bracket 18 also includes a pocket 19 in which a portion of the axle 14 is seated. Spring leaves 20 are positioned upon the upper securing bracket 18, the said spring leaves being of conventional design and construction and of varying lengths as indicated in Figure 1. The spring leaves 20 are secured to the axle 14 by means of a top securing bracket 21 which is suitably connected to the brackets 16 and 18 by means of a plurality of bolts 22 and nuts 23.

Referring now particularly to Figures 1 and 3, a wheel support assembly mounting structure is generally designated at 24. The mounting structure 24 comprises a bracket 25 of generally box shaped section. The bracket 25 may be suitably constructed of a casting or of a weldment. The bracket 25 comprises side walls 26 and end walls 27. Flanges 28 project longitudinally outwardly from the end walls 27, the said flanges 28 being suitably attached, as for instance by welding as indicated at 29, to the frame member 12. The side walls 26 also include access openings 30. A lower wall 31 is provided on the bracket 25, the said lower wall having an opening 32. A supporting pad 33 is provided with a stem 34 which projects through the opening 32 into the bracket 25, the said pad 33 retained therein by means of a pin 35 extending laterally through the stem 34. As best shown in Figure 3, the supporting pad 33 forms the engaging portion which supports the bracket 25 on the springs 20. The support pad 33 may be made of a suitable hardened material so as to accommodate the great amount of friction and stresses which may develop between the ends of the springs and the pad 33 during operation. The bracket 25 also comprises a pair of laterally spaced depending ears or walls 36. A spring retaining bolt 37 extends laterally through said walls 36, the said bolt 37 being suitably retained thereon by means of nuts 38.

Each bracket 25 also comprises a box-like structure 39 provided with a pocket, socket, or recess 40. The socket 40 comprises an inner bore 41 in which a sleeve 42 is positioned. The sleeve 42 is provided with an inner frusto-conical bore which tapers in a direction axially inwardly away from the ends of the springs 20. A frusto-conical or tapered plug 44 is matingly positioned in each pocket 40. The plug 44 includes a thrust face 45 and a thrust end 46. A rubber or cushioning sleeve 47 of cylindrical structure and having a frusto-conical shape surrounds the plug 44 and complements the bore 43 to resiliently seat the said plug 44 in the pocket 40. As best shown in Figure 3, a plurality of shims 48 are rigidly secured to one end of the socket 40 by means of a thrust plate 49. The thrust plate 49 is rigidly secured to the bracket 25 by means of a plurality of bolts 50.

The mounting structure 24 can be utilized in connection with either the front wheels or rear driving wheels of a vehicle. Assuming that the structure now is utilized for mounting non-driving front wheels and axle assembly to a vehicle, the following operation of the assembly takes place. While the vehicle is at rest, the resilient members 47 urge the thrust faces 45 of the plugs 44 against the ends of one of the springs 20 which, as best shown in Figure 3, happens to be the second spring from the top. This now serves to center the wheel support assembly 13 so that the assembly is properly assembled. Assuming now that the vehicle is moved in a forward direction, as shown in Fig. 1, the plug or thrust member 44 of the righthand bracket 25 in Figure 1 is moved rearwardly or inwardly further into the socket 40 whereupon the rubber sleeve 47 is compressed and the thrust face 46 then engages the thrust plate 49 of the last mentioned bracket 25. The springs, of course, support the brackets 25 through the pads 33. The springs 20 are also retained in floating relation against vertical displacement by means of the spring retaining bolts 37. Assuming now that the vehicle is braked the same aforementioned results prevail. Assuming now that the mounting structure 24 is utilized on the drive axle and wheels of a vehicle, then, of course, during forward movement of the vehicle the lefthand bushing 44 is moved into thrust relation with respect to the thrust plate 49 and upon braking the righthand bracket 25 assumes the longitudinal thrust forces.

Thus it can be seen that the axle wheel and spring assembly is floatingly positioned on the pads 33 for longitudinal movement, the said movement being limited by means of the brackets 25. The plugs 44 exert a thrust in a direction toward each other and against the ends of the springs so that the axle wheel and spring assembly is properly centered during non-moving and moving conditions of the vehicle. The shims 48 may be added to or may be removed depending upon the desired clearance between the thrust end 46 and the plate 49. The thrust plates 49, of course, transmit the braking and driving forces through the brackets 25 to the chassis 12. The shims 48 provide for proper adjustment depending upon the length and curvature of the spring leaves. When the spring leaves are in a position corresponding to a fully loaded truck, the spring leaves are, of course, longer in chordal length due to reduction in initial spring curvature from the unloaded condition. In this condition the plugs 44 are effective to engage the ends of the spring leaves thereby again providing for proper centering. As shown in Figure 3, in initial assembly, clearance is provided between the ends of the plugs 47 and the thrust plates 49, which prevents possible breakage when the springs are at maximum flat length.

Thus it can be seen that the objects of the invention have been fully achieved and that an improved mounting structure for a wheel axle and spring assembly has been disclosed. It must be understood that changes and modifications may be made without departing from the spirit of the invention as disclosed or from the scope of the appended claims.

What is claimed is:

1. In a vehicle having a chassis, a wheeled support for said chassis, said wheeled support including an axle, and a leaf spring assembly connected to said axle, said leaf spring assembly including a plurality of spring leaves extending longitudinally with said chassis; a mounting structure for connecting said assembly to said chassis including a pair of brackets, means connecting said brackets to said chassis adjacent opposite ends of said spring leaves, each bracket including a cylindrical socket, said sockets being in longitudinal alignment, a supporting pad connected to each bracket and engaging certain of said spring leaves for supporting said chassis on said assembly, a stop member on each bracket below certain of said spring leaves to limit relative vertical movement of said spring leaves, a cylindrical sleeve disposed in each socket, each sleeve having an inner frusto-conical bore terminating in a narrow portion at one end and a wider portion at an opposite end adjacent ends of spring leaves, a frusto-conical plug having a spring engageable wide end adjacent said spring leaf and a narrow thrust end, a frusto-conical resilient member having inner and outer frusto-conical walls, said resilient member being disposed around said plug and positioned within said bore, and a thrust plate connected to each of said brackets adjacent the narrow portions of said sleeves, said thrust plates being longitudinally adjustable toward and away from said spring leaves, said resilient members normally urging said plug wide ends against opposite ends of at least one of said spring leaves in a nonmoving position of said vehicle, one of said plugs being moved into engagement with one of said corresponding thrust plates during either forward or rearward movement of said vehicle.

2. In a vehicle having a chassis, a wheeled support for said chassis, said wheeled support including an axle, and a leaf spring assembly connected to said axle, said leaf spring assembly including a plurality of spring leaves extending longitudinally with said chassis; a mounting structure for connecting said assembly to said chassis including a pair of brackets, means connecting said brackets to said chassis adjacent opposite ends of said spring leaves, each bracket including a socket, said sockets being in longitudinal alignment, means on each bracket adapted to support said brackets on said spring leaves, a stop member on each bracket below certain of said spring leaves to limit relative vertical movement of said spring leaves, a cylindrical sleeve disposed in each socket, each sleeve having an inner frusto-conical bore terminating in a narrow portion at one end and a wider portion at an opposite end adjacent ends of said spring leaves, a frusto-conical plug having a spring leaf engageable wide end adjacent said spring and a narrow thrust end, a frusto-conical resilient member having inner and outer frusto-conical surfaces, said resilient member being disposed around said plug and positioned within said bore, and a thrust plate connected to each of said brackets adjacent the narrow portions of said sleeves, said thrust plates being longitudinally adjustable toward and away from said spring leaves, said resilient members normally urging said plug wide ends against opposite ends of at least one of said spring leaves in a nonmoving position of said vehicle, one of said plugs being moved into engagement with one of said corresponding thrust plates during either forward or rearward movement of said vehicle.

3. In a vehicle having a chassis, a wheeled support for said chassis, said wheeled support including an axle, and a leaf spring assembly connected to said axle, said leaf spring assembly including a spring leaf extending longitudinally with said chassis; a mounting structure for connecting said assembly to said chassis including a pair of brackets, means on said brackets engaging and being adapted to be supported on said assembly, means connecting said brackets to said chassis adjacent opposite ends of said spring leaf, each bracket including a socket, a cylindrical sleeve disposed in each socket, each sleeve having an inner frusto-conical bore terminating in a narrow portion at one end and a wider portion at an opposite end adjacent ends of said spring leaf, a frusto-conical plug having a spring leaf engageable wide end adjacent said spring leaf and a narrow thrust end, a frusto-conical resilient member having inner and outer frusto-conical walls, said resilient member being disposed around said plug and positioned within said bore, and a thrust plate connected to each of said brackets adjacent the narrow portions of said sleeves, said thrust plates being longitudinally adjustable toward and away from said spring leaf, said resilient members normally urging said plug wide ends against opposite ends of said spring leaf in a nonmoving position of said vehicle, one of said plugs being moved into engagement with one of said corresponding thrust plates during either forward or rearward movement of said vehicle.

4. In a vehicle having a chassis, a wheeled support for said chassis, said wheeled support including an axle, and a leaf spring assembly connected to said axle, said spring assembly including a spring leaf extending longitudinally with said chassis; a mounting structure for connecting said assembly to said chassis including a pair of brackets, means on said brackets engaged by and supported on said assembly, means connecting said brackets to said chassis adjacent opposite ends of said spring leaf, each bracket including a recess, a sleeve disposed in each recess, each sleeve having an inner frusto-conical bore terminating in a narrow portion at one end and a wider portion at an opposite end adjacent ends of said spring leaf, a frusto-conical plug having a spring leaf engageable wide end adjacent said spring and a narrow thrust end, a frusto-conical resilient member having inner and outer frusto-conical walls, said resilient member being disposed around said plug and positioned within said bore, and a thrust plate connected to each of said brackets adjacent the narrow portions of said sleeves, said thrust plates being longitudinally adjustable toward and away from said spring leaf, said resilient members normally urging said plug wide ends against opposite ends of said spring leaf in a nonmoving position of said vehicle, one of said plugs being moved into engagement with one of said corresponding thrust plates during either forward or rearward movement of said vehicle.

5. In a vehicle having a chassis, a wheeled support for said chassis, said wheeled support including an axle, and a leaf spring assembly connected to said axle, said leaf spring assembly including a spring leaf extending longitudinally with said chassis; a mounting structure for connecting said assembly to said chassis including a pair of brackets supported on said assembly, means connecting said brackets to said chassis adjacent opposite ends of said spring leaf, each bracket including a socket, a sleeve disposed in each socket, each sleeve having an inner frusto-conical bore terminating in a narrow portion at one end and a wider portion at an opposite end adjacent ends of said spring leaf, a frusto-conical plug having a spring leaf engageable wide end adjacent said spring leaf and a narrow thrust end, a frusto-conical resilient member having inner and outer frusto-conical walls, said resilient member being disposed around said plug and positioned within said bore, and a thrust plate connected to each of said brackets adjacent the narrow portions of said sleeves, said resilient members normally urging said plug wide ends against opposite ends of said spring leaf in a nonmoving position of said vehicle, one of said plugs being moved into engagement with one of said corresponding thrust plates during either forward or rearward movement of said vehicle.

6. In a wheel support for supporting a vehicle chassis, said support including an axle and a leaf spring connected to said axle; a mounting structure for connecting said wheel support to said chassis comprising, a bracket connected to said chassis adjacent one end of said leaf spring, said leaf spring engaging said bracket in supporting relation, said bracket having a longitudinally extending socket, a sleeve disposed in said socket, said sleeve having an inner frusto-conical wall tapering inwardly in a direction away from said assembly, a frusto-conical plug in said sleeve in mating relation, said plug having a thrust face and a thrust end, a resilient member around said plug and conforming to the inner wall of said sleeve, said resilient member urging said thrust face against said leaf spring during a nonmoving position of said vehicle chassis, and a thrust plate connected to said bracket adjacent said thrust end, whereby during movement of said vehicle said leaf spring engages said thrust face and said thrust end engages said thrust plate, said thrust plate being longitudinally adjustable relative to said leaf spring.

7. In a wheel support for supporting a vehicle chassis, said support including an axle and a leaf spring connected to said axle; a mounting structure for connecting said wheel support to said chassis comprising, a bracket connected to said chassis adjacent one end of said leaf spring, said leaf spring engaging said bracket in supporting relation, said bracket having a socket, a sleeve disposed in said socket, said sleeve having an inner frusto-conical wall tapering axially inwardly in a direction away from said assembly, a tapered plug in said sleeve in mating relation, said plug having a thrust face and a thrust end, a resilient member around said plug and conforming to the inner wall of said sleeve, said resilient member urging said thrust face against said leaf spring during a nonmoving position of said vehicle chassis, and a thrust plate connected to said bracket adjacent said thrust end, whereby during movement of said vehicle said leaf spring engages said thrust face and said thrust end engages said thrust plate, said thrust plate being longitudinally adjustable relative to said leaf spring.

8. In a wheel support for supporting a vehicle chassis, said support including an axle and a leaf spring connected to said axle; a mounting structure for connecting said wheel support to said chassis comprising, a bracket connected to said chassis adjacent one end of said leaf spring, said leaf spring engaging said bracket in supporting relation, said bracket having a socket, a sleeve disposed in said socket, said sleeve having an inner wall tapering axially inwardly in a direction away from said assembly, a tapered plug supported within said sleeve, said plug having a thrust face and a thrust end, resilient means supported on said sleeve and cooperating with said plug for urging said thrust face against said leaf spring during a nonmoving position of said vehicle chassis, and a thrust plate connected to said bracket adjacent said thrust end, whereby during movement of said vehicle said leaf spring engages said thrust face and said thrust end engages said thrust plate.

9. In a wheel support for supporting a vehicle chassis, said support including an axle and a leaf spring connected to said axle; a mounting structure for connecting said wheel support to said chassis comprising, brackets connected to said chassis adjacent each end of said leaf spring, said leaf spring engaging said brackets in supporting relation, said brackets each having a socket, a sleeve disposed in said socket, said sleeve having an inner wall tapering axially inwardly in a direction away from said assembly, a tapered plug supported within said sleeve, said plug having a thrust face and a thrust end, resilient means supported on said sleeve and cooperating within said plug for urging said thrust face against said leaf spring during a nonmoving position of said vehicle chassis, and a thrust plate connected to said bracket adjacent said thrust end, whereby during movement of said vehicle said leaf spring engages said thrust face and said thrust end engages said thrust plate, said thrust plate being longitudinally adjustable relative to said leaf spring.

10. In a wheel support in accordance with claim 9, wherein said thrust end is longitudinally spaced from said thrust plate during a condition wherein said leaf spring is at a maximum flat length position.

References Cited in the file of this patent
UNITED STATES PATENTS

| | | |
|---|---|---|
| 2,482,488 | Julien | Sept. 20, 1949 |
| 2,831,675 | Norrie et al. | Apr. 22, 1958 |

FOREIGN PATENTS

| | | |
|---|---|---|
| 756,981 | France | Oct. 2, 1933 |